United States Patent [19]

Krenke et al.

[11] 3,809,265
[45] May 7, 1974

[54] BAKERY PRODUCT DEPANNING APPARATUS

[75] Inventors: Norman O. Krenke, Saginaw; De Witt Sims, Burt, both of Mich.

[73] Assignee: Baker Perkins Inc., Saginaw, Mich.

[22] Filed: Dec. 13, 1971

[21] Appl. No.: 207,137

[52] U.S. Cl.......... 214/309, 137/454.2, 137/533.19, 294/64
[51] Int. Cl.............................................. A21b 3/18
[58] Field of Search ................ 214/309; 294/64, 65; 137/454.2, 519, 533.13, 533.19

[56] References Cited
UNITED STATES PATENTS

| | | | |
|---|---|---|---|
| 3,170,581 | 2/1965 | Temple............................... | 214/309 |
| 3,230,002 | 1/1966 | Olson................................ | 294/64 R |
| 3,451,067 | 6/1969 | Jordon.............................. | 137/519 X |
| 3,598,439 | 8/1971 | Dahlquist............................ | 294/65 |

Primary Examiner—Robert G. Sheridan
Assistant Examiner—George F. Abraham
Attorney, Agent, or Firm—Learman & McCulloch

[57] ABSTRACT

Depanning apparatus for removing bakery products, such as bread loaves, from pans on a product-supplying conveyor and transferring them to a discharge conveyor comprising: a vacuum box having an opening in the bottom thereof; a perforated endless transfer conveyor including a lower run covering the opening in the box; a plurality of dependent resilient cups mounted on the transfer conveyor and including passages communicating with the perforations in the endless transfer conveyor; and vacuum responsive valve members mounted in the cups for movement to and from operative positions blocking the passages when the resilient cups are not sealed to a product and a predetermined vacuum exists in the box. An assembly is also provided in the box for selectively preventing communication of the vacuum source with the cups over a predetermined area of the traveling conveyor.

26 Claims, 7 Drawing Figures

PATENTED MAY 7 1974 3,809,265

INVENTORS
NORMAN O. KRENKE
DE WITT SIMS
BY
*Learman & McCulloch*
ATTORNEYS

INVENTORS
NORMAN O. KRENKE
DE WITT SIMS

BY

*Learman & McCulloch*

ATTORNEYS

BAKERY PRODUCT DEPANNING APPARATUS

FIELD OF THE INVENTION

This invention relates to apparatus employing vacuum cups for depanning bakery products and more particularly to bakery product transfer apparatus including mechanism for controlling the vacuum lifting forces in product lifting vacuum cups.

BACKGROUND OF THE INVENTION

Bakery product transfer apparatus of the type disclosed in U. S. Pat. No. 3,170,581, granted Feb. 23, 1965, has been provided with hollow, flexible, bellows-type suction members, or cups, for sealing to the tops of bakery products to lift the products from pans on a supply conveyor and transfer them to a discharge conveyor. Vacuum lifting forces are communicated to passages provided in the bellows type suction cups by means of a vacuum box which is connected to a suction fan. When the resilient bellows members are not in sealing engagement with loaves of bread, air at atmospheric pressure will pass therethrough to the box tending to reduce the vacuum in the box. Therefore, the fan which is utilized to create the suction in the box must have a substantially larger capacity than that which would be otherwise necessary if the non-loaf-engaging vacuum cups were closed to atmosphere during start-up. The increased fan capacity necessarily increases the noise level, cost, and size of the operating equipment. Accordingly, it is an object of the present invention to provide apparatus for depanning bakery products, including suction cups for sealing to the tops of the products, and apparatus for blocking communication of the cups with the vacuum source when the cups are not sealed to a product.

It is another object of the present invention to provide a depanning machine having suction control apparatus of the character mentioned.

It is a further object of the invention to provide bakery product transfer apparatus including suction cups for lifting and transferring products, and suction control apparatus which will minimize the volume of air that must be displaced to create the necessary lifting vacuum.

It is yet another object of the present invention to provide transfer apparatus including vacuum cups which seal to the product and lift the product to a remote location, and suction control apparatus for interrupting communication between each of the vacuum cups and the vacuum source when a predetermined vacuum pressure is exceeded and the cup is not sealed to a product.

In transfer conveyors of the type mentioned, resilient cup members are mounted on apertured slats so as to communicate with the vacuum box when they pass along the underside thereof. Accordingly, still another object of the present invention is to provide suction control members, with conveyors of the type mentioned, which are quickly and simply replaceable so that the entire conveyor apparatus need not be disassembled in the event of vacuum cup malfunction.

During "start-up", the problem of building vacuum in the box is particularly acute because all of the bellows cup members are initially opened to atmosphere. Accordingly, it is a still further object of the present invention to provide apparatus for blocking the passages in a plurality of cups so that the vacuum will quickly build in the unblocked cups.

Other objects and advantages of the present invention will become apparent to those of ordinary skill in the art as the description thereof proceeds.

SUMMARY OF THE INVENTION

Depanning apparatus for lifting products, such as bread loaves, from pans on a product supplying conveyor and transferring them to a remote location comprising: a vacuum box having an opening in the bottom thereof and communicating with a vacuum source for creating a predetermined vacuum condition in the box, a perforated endless transfer conveyor including a lower run covering the opening in the box, a plurality of dependent resilient cups mounted on the conveyor for sealing to the tops of products to be removed and including passages communicating with the perforations in the endless transfer conveyor, and valve plate means slidably mounted in each resilient cup for movement between an inoperative non-blocking position and an operative position blocking the cup passage when a predetermined vacuum exists in the box and the resilient cup is not sealed to the top of the product.

The present invention may more readily be described by reference to the accompanying drawings, in which.

THE DESCRIPTION OF THE PREFERRED EMBODIMENT

Figure 1:
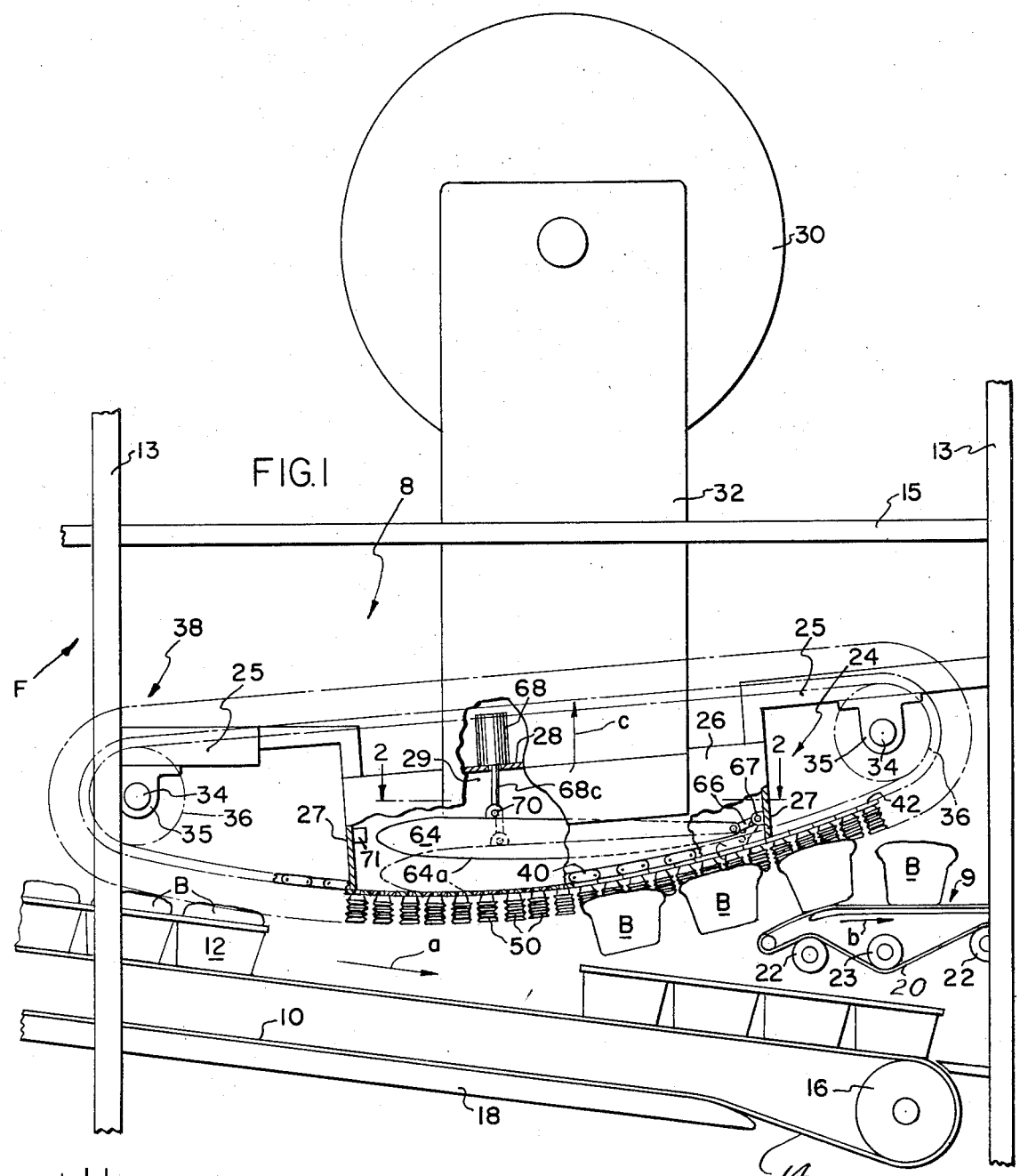
FIG. 1 is a partially schematic, side elevational view illustrating a depanning machine incorporating vacuum control apparatus constructed according to the present invention for selectively blocking the flow of air through the suction cups, the side wall of the vacuum box being broken away to more clearly illustrate a pivotal vacuum control shoe which is employed.

Apparatus constructed according to the present invention is supported by a frame or framework, generally designated F, which includes pairs of vertical rails 13 spanned by generally horizontal side members 15. Such apparatus is generally and is provided for transferring loaves of bread B, supported in pans or pansets 12, from a supply conveyor, generally designated 10, to a discharge conveyor, generally designated 9. The supply conveyor 10 may comprise an endless belt 14 trained around a pair of frame supported drive rolls 16. The discharge conveyor 9, is preferably of the conventional slat type, wherein a pair of laterally spaced, endless chains 20 are spanned by spaced apart rod members (not shown) to form a continuous endless conveyor member. Such rod members are shown in the aforementioned U.S. Pat. No. 3,170,581 which is incorporated by reference. Endless chains 20 are trained around suitable idler sprockets 22, and drive sprockets 23 for moving the endless member 20 in the direction of the arrow b (FIG. 1). The supply and discharge conveyors 10 and 9, respectively are driven by suitable sources of power such as electric motors M1 and M2 (FIG. 6) drivingly connected to the shafts on which the drive rolls and sprockets, 16 and 23 respectively, are mounted. The frame F includes supporting rails 18 for supporting the lower run of the belt 14.

Transfer apparatus 8, constructed according to the invention, includes a suction box, generally designated 24, supported on the vertical rails 13 by longitudinal support members 25, and includes a pair of side walls 26, front and rear end walls 27, and an upper wall 28 spanning the side and end walls. The walls 26, 27 and 28 define a downwardly opening vacuum chamber 29.

A vacuum creating suction fan 30 is also provided, and includes an intake pipe 32, communicating through one side wall 26 of the vacuum box 24 with the chamber 29 defined by the walls of the vacuum box. The fan 30 is continuously driven by a suitable source of power, such as an electric motor M3 (FIG. 6), and operates to draw air from the box 24 in the direction represented by the arrow c to release it out a fan exit opening.

Figure 6:
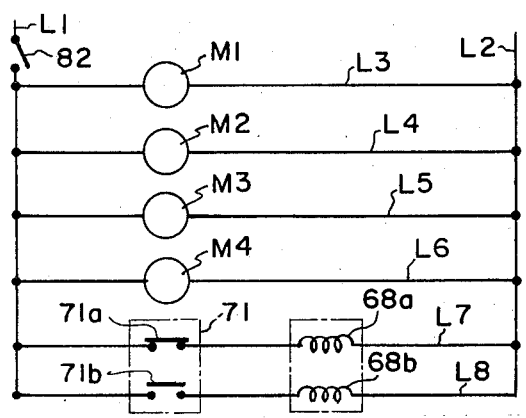
FIG. 6 is a schematic diagram illustrating a typical electrical control circuit for operating the apparatus illustrated in FIGS. 2 – 5.
Figure 2:
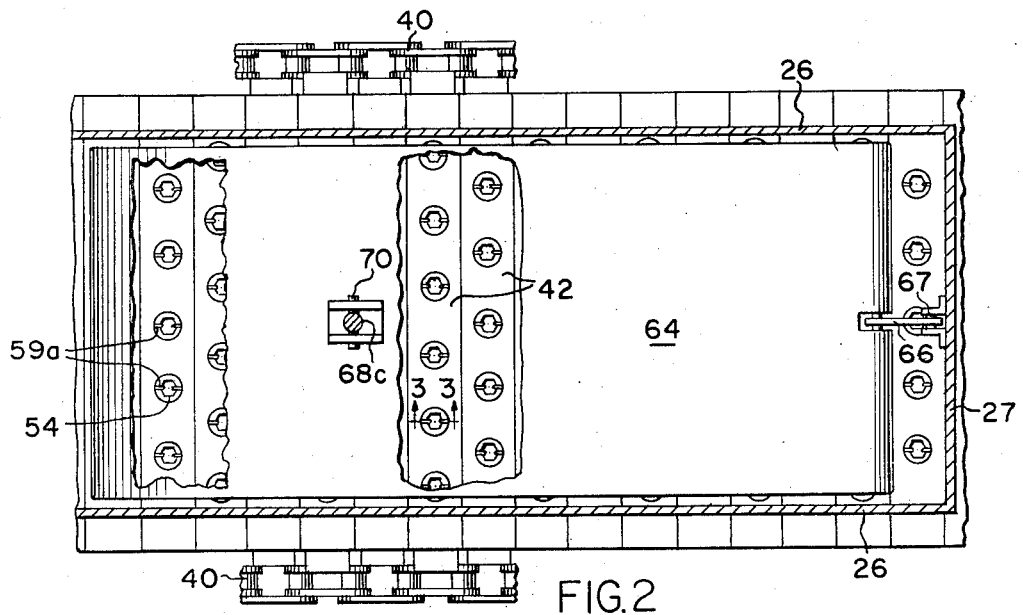
FIG. 2 is a fragmentary top plan view, taken along the line 2—2 of FIG. 1, and particularly illustrating the relationship between the pivotal vacuum control shoe in the vacuum box and the endless lifting conveyor.

Mounted on a pair of parallel shafts 34, journaled by bearings 35 provided on the longitudinal frame members 25, are sprockets 36 around which an endless member, generally designated 38, and comprising a pair of endless chains 40 (FIG. 2) carrying a system of parallel slats 42, is trained. The particular construction of the endless member 38 is described in U.S. Pat. No. 3,170,583. One of the shafts 34 is driven by a suitable source of power such as an electric motor M4 (FIG. 6). The slats 42 each have a plurality of laterally spaced apart, threaded apertures 44 (FIG. 3) therethrough, each threadedly receiving an externally threaded mounting or connector member 46 having an enlarged annular flange 48 which supports a bellows type, resilient cup member 50. The resilient bellows member 50 includes a reduced diameter end flange portion 52 which is removably mounted on the flange 48, and a loaf-engaging opposite end lip portion 53 which seals to the irregular configuration of the top surface of a loaf B when moved into engagement therewith. The connector members 46 each include a hexagonally shaped air passage 54 therethrough, communicating the vacuum chamber 29 and each hollow, resilient cup 50 on the lower run of the conveyor 38 adjacent the opening in the bottom of the box.

THE VACUUM CUP VALVE ASSEMBLY

To selectively interrupt a passage 54, a valve member, generally designated 56, is provided and includes a U-shaped resilient clip member 58 having a pair of opposed legs 59 yieldably engaging the side wall of the vacuum communicating passage 54. The legs 59 include folded portions 57 which extend radially outwardly relative to the axis of the passage 54 so as to engage the end face 46a of the connector member 46 and prevent axially inward movement of clip member 58.

The terminal ends 59a of the legs 59 flare radially outwardly and bear against the opposite end face 46b of the mounting member 46 to selectively prevent axial movement of the clip 58 in the axially opposite direction. The normal spread apart position of resilient legs 59 is sufficiently greater than the compressed position in which they are shown in FIG. 3, that the clips 58 are securely held in position in the openings 54.

Figure 3:
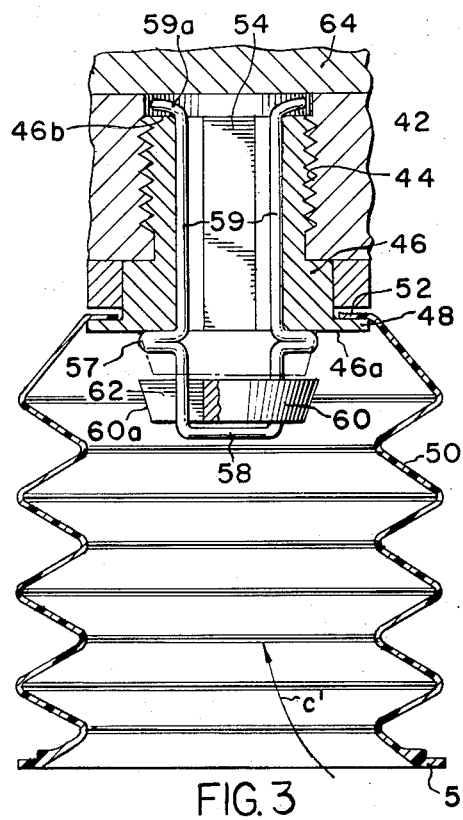
FIG. 3 is an enlarged vertical, sectional elevational view, taken along the line 3—3 of FIG. 2, and particularly illustrating one of the vacuum cup assemblies.
Figure 4:
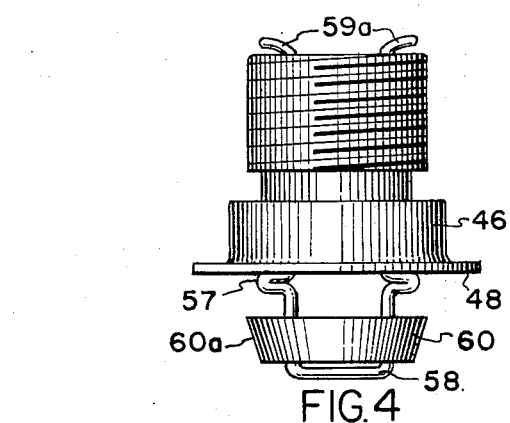
FIG. 4 is a side elevational view particularly illustrating only the control valve portion of the suction cup assembly illustrated in FIG. 3.

Slidably supported on the clip 58 for movement between the open position, illustrated in solid lines in FIG. 3, and the passage-sealing position, illustrated in chain lines in FIG. 3, is a valve plate 60 having a predetermined weight and including a pair of open ended slots 62 (FIG. 5) receiving the opposed legs 59 of the clip 58. In normal operation, when the lip portion 53 of a bellows cup 50 cannot seal to the top surface of a loaf B, the resulting in-rush of air to the vacuum chamber 29 in the direction of the arrow c' (FIG. 3) will raise the plate 60. Initially, at start-up, however, the vacuum condition in the vacuum box chamber 29 will be below the predetermined necessary operating condition and the resulting in-rush of air will be of insufficient velocity and volume to raise the valve plate 60 to the passage blocking position illustrated in chain lines in FIG. 3. This problem is solved in a manner to now be described.

THE VACUUM CONTROL SHOE ASSEMBLY

Disposed within the suction chamber 29, is apparatus for selectively blocking the passages 54 in a predetermined number of vacuum cups 50 along a portion of vacuum box 24 such as the trailing portion of the vacuum box, from the opposite upper sides of the passages. This mechanism comprises a shoe, generally designated 64, pivotally connected with a link 66 which is pivoted on a pivot pin 67 fixed to one of the suction box end walls 27. The shoe 64, which preferably is constructed of wear-resistant material and may span the slats 42, has a profile which generally conforms to the curvilinear path of the endless member 38 and the curvature of the lower edges of the side walls 26.

Apparatus is provided for pivoting the shoe 64 about the pivot pin 67, between the position illustrated in chain lines in FIG. 1, and the blocking position shown in solid lines in FIG. 1. In the latter position the underside 64a of the shoe 64 is slidably engaged by the conveyor slats 42, along the trailing portion of the vacuum box 24, to block the passages 54 in several transverse rows of suction cups 50. The pivoting apparatus may include a double-acting, fluid pressure operated cylinder 68 mounted on the top wall 28 of the vacuum box 24 and having a piston rod 68c, pivotally connected at 70 to the control shoe 64. Solenoid actuated valves (FIG. 6) are provided for selectively directing fluid to opposite ends of the cylinder 68 to control movement of the piston 68c.

A conventional fluid pressure switch 71 such as the Mercoid pressure switch, type DA-31, Range 0–30 inches of water, is mounted in the chamber 29 for sensing the pressure or vacuum condition in chamber 29 for a purpose to presently be described.

THE CONTROL SYSTEM

Referring now more particularly to FIG. 6, a schematic diagram of a typical electrical control circuit is illustrated, and includes a pair of lines L1 and L2 connected across a suitable source of power such as 110 volts, 60 cycle alternating current. A start switch 82 is included in line L1. The supply conveyor drive motor M1, the discharge conveyor drive motor M2, the fan drive motor M3, and the transfer conveyor drive motor M4, are connected in lines L3, L4, L5 and L6 across the lines L1 and L2. The vacuum switch 71, mounted in the vacuum chamber 29, on one of the vacuum box end walls 27, includes sets of contacts 71a and 71b which are closed and opened respectively when the vacuum in the chamber 29 is less than a predetermined value, and are opened and closed respectively when the vacuum condition of predetermined value is reached in the chamber 29. The switch contacts 71a are connected in series circuit in line L7 with the advance solenoid 68a for operating a valve so as to direct fluid to the cylinder 68 in such a manner as to move the piston rod 68c downwardly to the position illustrated in FIG. 1. The switch contacts 71b are connected in series circuit in line L8 with the retract solenoid 68b for operating a valve such that fluid is directed to the cylinder 68 in such a manner as to retract the piston rod to move the shoe 64 from the solid line position illustrated in FIG. 1 to the chain line position also illustrated in FIG. 1.

THE OPERATION

When the start switch 82 (FIG. 6) is closed, the bread-supplying conveyor drive motor M1 is started to drive the product-supplying conveyor 10 and move the bread loaves B along the path indicated by the arrow a. The discharge conveyor drive motor M2 is operated to drive the discharge conveyor 9, and the transfer conveyor drive motor M4 is operated to drive the transfer conveyor 38. The fan drive motor M3 is started and continuously operated to drive the suction fan 30 to create suction within the chamber 29. Initially, no cups 50 will be in contact with loaves B.

When vacuum builds in the vacuum chamber 29, air will be drawn into the chamber 29 through the bellows cup passages 54 in the direction of arrow c' (FIG. 3), however, during start-up, the flow of air, with the lower horsepower fan motor which can be employed, will be insufficient to move the valve plates 60 upwardly to the passage-blocking position illustrated in chain lines in FIG. 3. The shoe 64 is initially in the raised chain line position illustrated in FIG. 1. When the fan 30 is started, the vacuum box pressure sensed by the vacuum switch 71 is below a predetermined value and the contacts 71a will close to energize the shoe advance solenoid 68a so that the passage-blocking shoe 64 is moved from the chain line position, shown in FIG. 1, to the solid line position also illustrated in FIG. 1, engaging the conveyor slats 42 along the trailing portion of the vacuum box 24 to block a plurality of the passages 54 and prevent communication of the box 24 with the rows of bellows cups 50 thereunder. When the shoe 64 is moved to the solid line position illustrated in FIG. 1 and closes the openings in the vacuum cups along the trailing portion of the vacuum box, the vacuum in the box 24 will build to a value less than the predetermined value which will activate switch 71, but sufficient so that the velocity and the volume of air moving in the direction of the arrow c in the unblocked passages 54 along the leading portion of the vacuum box 24 will move the valve plates 60 therein upwardly to close the passages 54 in the mounting members 46 not blocked by the shoe 54. With all of the passages 54 underneath the box 24 blocked, the vacuum within the chamber 29 will build to the predetermined. value and the contacts 71b will close and energize the shoe retract solenoid 68b to move the shoe 64 to the chain line position illustrated in FIG. 1. The suction cup assemblies along the leading edge of the vacuum box 24 will now be in communicating relation with the chamber 29 and in condition to lift any loaves B with which they are engaged. If the resilient bellows cups 50 engage and seal to loaves B of bread on the conveyor 10, the loaves B will move with the cups to discharge conveyor 9, where they are discharged when the vacuum is released in the cups as the cups 50 pass the trailing edge of the vacuum box 24.

The bellows cups 50 first engage the loaves B upstream of box 24. If the cups 50, when they reach the leading portion of the vacuum box, are not in contact with and sealed to any bread loaves B, the valve plates 60 associated therewith will move up with the resulting in-rush of air and close the passages 54 associated therewith. This only serves to increase the vacuum in box 24.

If the vacuum in the chamber should drop below the predetermined value anytime during the operation, the contacts 71a again will close and the vacuum control shoe 64 again will swing to the solid line position, illustrated in FIG. 1, temporarily blocking a portion of the passages 54 along the trailing portion of the box 24 to build the vacuum in the box.

In the event it is desired to remove one of the valve plates 60, it is only necessary to squeeze the legs 59 of the clip 58 together and move the clip 58 axially outwardly. The valve plate 60 can then be turned so that the legs 59 are removed from the slots 62 in the valve plate 60. The valve plate 60 can then be easily removed and replaced with another valve plate.

Apparatus constructed according to the present invention will require a smaller blower and a smaller, less costly fan-driving motor because a smaller volume of air need be moved to create and maintain the desired vacuum condition. This will result in a more efficient operation with a greatly reduced noise level. The invention provides for automatic. air intake control with very little, if any, pick-up of the seeds commonly used on bakery products. Presently existing vacuum cup conveyor systems can be easily converted to employ apparatus constructed according to the present invention. The apparatus may, of course, be easily installed on equipment being presently manufactured or already existing in the field.

Figures 5, 7:
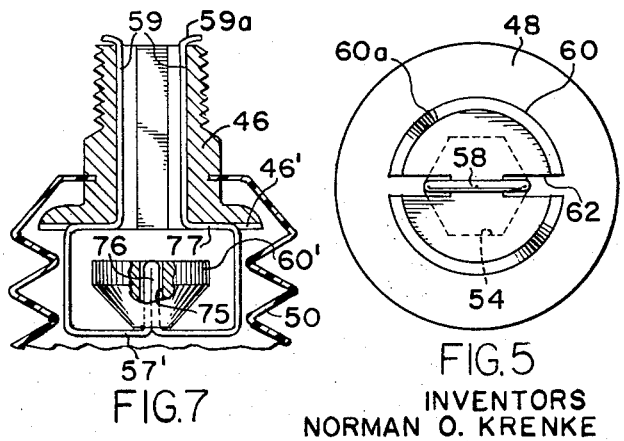
FIG. 5 is a bottom plan view of the valve apparatus illustrated in FIG. 4.
FIG. 7 is a view similar to FIG. 3, illustrating a modified cup assembly.

It will be observed that the side of the valve disc 60 is beveled as at 60a to decrease the likelihood of the valve 60 being moved upwardly by a sharply contracting bread-bearing cup which is deformed by contact with the bread to the extent it engages the valve 60 and physically pushes the valve upwardly. In FIG. 7 an improved spring clip 57' is utilized for the cup 50 and mounts a more severely beveled valve member 60' which has a central opening 75 of a size to slidably receive a central fold portion 76 of unitary clip 57', the clip 57' having, as before, leg portions 59 with ends 59a adapted to engage over the upper end of member 46. So as not to interfere with the closing of valve 60', the member 46 is milled as at 46' to receive horizontally extending portions 77 of the clip 57'. As previously, the legs 59 of the spring steel clip are normally spaced apart a greater distance than the opening 54 in which they are received, and must be compressed in order to be inserted into the member 46. They will then support the valve 60' for movement upwardly and downwardly to and from closed and open position.

Typically, a valve 60' may weigh about 8 grams and have to move a distance of 0.2 inches from removed to sealing position. A vacuum condition of typically 10 inches of water will be required in plenum chamber 29 to move any valve 60 to closed position and a plenum vacuum condition of typically 2 inches of water will keep it closed. Also, typically, a plenum vacuum chamber of 18 inches of water is the critical condition at which switch 71 is set to operate so that shoe 64 will remain lowered until the plenum vacuum reaches this value.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention of the scope of the appended claims.

We claim:

1. Depanning apparatus for lifting bakery products, such as bread loaves, from pans on a product supplying conveyor and transferring them to a remote location comprising:
   a vacuum box assembly having opening providing means in one side thereof and communicating with a vacuum source for creating a vacuum condition in said box assembly;
   endless conveyor means having a run portion generally covering the opening providing means and including sections with through-ports therein communicating with the interior of said vacuum box assembly through said opening providing means; said conveyor means also including a plurality of resilient hollow product lifting suction cups forming, with said ports, passages communicating with the interior of the vacuum box assembly;
   releasable support means comprising resilient valve retainer clips compressible to be releasably mounted in said passages; and
   vacuum responsive valve means mounted by said releasable retainer clips for movement between an inoperative position and an operative position substantially discommunicating said passages when said resilient suction cups are not sealed to a product and a predetermined vacuum exists in said box assembly.

2. The assembly set forth in claim 1 wherein said valve means is mounted on said support means so as to be removable therefrom when the support means is only partially removed from the perforations.

3. The assembly set forth in claim 2 wherein said support means comprises U-shaped clips having opposed legs yieldably engaging the side walls of said perforations, said valve means including generally opposed open ended slots receiving the legs of said clips.

4. The assembly set forth in claim 1 wherein said support means comprises a generally U-shaped clip having opposed legs resiliently engaging the side walls of the perforations in the endless conveyor means, each of said clips including at least one laterally extending and folded back portion engaging a portion of said endless conveyor means to prevent displacement of said clip toward the endless conveyor means.

5. The assembly set forth in claim 4 wherein each of said support means includes additional radially outwardly extending portions engaging said endless conveyor means to prevent displacement in the opposite direction.

6. The assembly of claim 5 wherein said additional portions are axially spaced from said laterally extending portions.

7. The assembly of claim 1 wherein said support means comprises resilient generally U-shaped clip means disposed in the perforations in the endless conveyor means and having opposed contractible legs movable toward and away from each other to selectively release and secure said clip means.

8. The assembly of claim 7 wherein said legs include radially extending portions relatively movable with said legs between positions permitting and preventing their free movement through said perforations.

9. The assembly of claim 8 wherein said radially extending portions are axially spaced.

10. In a depanner having product supplying conveyor means for supplying products, such as bread loaves, in a path of travel; transfer apparatus for moving the products out of said path of travel and transferring them to a remote location comprising:
    a frame;
    a traveling conveyor mounted on said frame for movement in a conveying path of travel;
    perforate suction means on said traveling conveyor for sealing to the upper portion of the products on said supplying conveying means;
    means for communicating a source of vacuum to a predetermined length of said traveling conveyor; and
    vacuum control means, including pressure sensing switch means, for controlling the lifting forces in said suction means along said predetermined length of conveyor and an actuable means movable in response to said switch means to block the perforations in a portion of said perforate suction means to increase the suction force in the non-blocked portion of said perforate suction means.

11. The depanner set forth in claim 10 wherein said actuable means comprises means movable between a remote position and a position adjacent said traveling conveyor.

12. The depanner of claim 10 wherein said transfer apparatus includes a downwardly opening suction box adapted to communicate with a vacuum source, said traveling conveyor comprising an endless conveyor having a lower run extending along the lower portion of said box and covering said opening in said box, said vacuum control means including means movable in response to the vacuum in said suction box.

13. The depanner set forth in claim 12 wherein said endless conveyor has a plurality of apertures therein communicating with said vacuum box when the lower run passes along said lower side of said box, said actuable means being movable in said box from a raised position to a lowered position in engagement with said endless conveyor to block the apertures in the endless conveyor along only a portion of said box.

14. The transfer apparatus of claim 10 wherein said transfer apparatus includes a downwardly opening suction box open at its lower side; said traveling conveyor comprising an endless conveyor having a lower run extending along the lower portion of said box and covering the opening in the box; said perforate suction means including a plurality of passages opening to said suction box as the lower run passes under said box; said actuable means comprising valve plate means movable between a remote position permitting vacuum to be communicated to said resilient cup means and a blocking position preventing vacuum from being communicated to said resilient cup means in response to a predetermined vacuum condition in said box.

15. The apparatus of claim 10 wherein said perforate suction means comprise vacuum cups; said transfer apparatus includes means responsive to the vacuum condition in said box for operating said actuable means to move it to blocking position; and said actuable means comprises a shoe spanning a plurality of said cups.

16. The apparatus set forth in claim 10 including valve means associated with said suction means for selectively interrupting communication between said vacuum source and said suction means when the suction means is unblocked and the vacuum communicated is greater than a first predetermined value, said vacuum control means including means for moving said actuable means from said remote position to said blocking position in response to a vacuum less than a second predetermined greater vacuum condition and for moving said actuable means from said blocking position to said remote position in response to a predetermined vacuum condition greater than said second condition.

17. Transfer apparatus for lifting bakery products, such as bread loaves, from a product-supplying conveyor and transferring them to a remote location comprising:
a vacuum box having an opening in the lower side thereof and communicating with a vacuum source for creating a vacuum condition in said box;
perforated endless conveyor means, including a lower run section covering the opening in said box;
a plurality of resilient cup means mounted on said conveyor means and including passages communicating with the perforations in said endless conveyor means;
valve means associated with each cup means for selectively blocking those passages which are not blocked by products when the vacuum force in said box reaches a first predetermined value to aid in building the vacuum force in the box to a greater value;
actuable means in said vacuum box movable between a remote inoperative position and a position blocking communication between the passages and vacuum source along a predetermined portion of said lower run section;
means responsive to less than a predetermined second greater vacuum condition in said box for moving said actuable means from said inoperative position to said operative blocking position to increase the vacuum forces in said box to said second predetermined value; and
means responsive to a vacuum condition greater than said second predetermined vacuum value in said box for moving said actuable means to said inoperative position.

18. Depanning apparatus for lifting bakery products such as bread loaves, from pans on a product supplying conveyor and transferring them to a remote location comprising:
a vacuum box assembly having opening providing means in one side thereof and communicating with a vacuum source for creating a vacuum condition in said box assembly;
perforated endless conveyor means, including a run portion generally covering the opening providing means, and a plurality of hollow, resilient suction cups forming, with said perforations, passages communicating with the interior of the vacuum box assembly through said opening providing means;
releasable support means comprising clips having opposed axially extending legs mounted in and extending in the axial direction of said passages on said endless conveyor means, each clip including valve guide means comprising a pair of sections extending in said axial direction and joined to said legs by radially extending portions extending substantially perpendicularly to said legs; and
substantially inflexible vacuum responsive valve means having openings in their walls receiving said sections mounted for movement along said sections between an inoperative position and an operative position substantially discommunicating said passages when said resilient suction cups are not sealed to a product and a predetermined vacuum exists in said vacuum box assembly.

19. Depanning apparatus for lifting bakery products, such as bread loaves, from pans on a product supplying conveyor and transferring them to a remote location comprising:
a vacuum box assembly having opening providing means in the lower side thereof and communicating with a vacuum source for creating a vacuum condition in said box assembly;
perforated endless conveyor means, including a lower run covering the opening providing means in said box and a plurality of resilient hollow suction cups forming, with the perforations, passages communicating with the interior of the vacuum box assembly through said opening providing means;
releasable support clips mounted in said passages, formed with guides, extending in the axial direction of said passages, from which portions extend laterally outwardly; said clips also including immediately laterally inwardly extending return portions between said guides and said perforations which position the clips in predetermined position within said passages; and
non-biased vacuum responsive valve members having a predetermined weight mounted by said guides for movement a predetermined distance between an inoperative position and an operative position substantially discommunicating said passages when said resilient cups are not sealed to a product and a predetermined vacuum exists in said box assembly.

20. Depanning apparatus for lifting bakery products, such as bread loaves, from pans on a product supplying conveyor and transferring them to a remote location comprising:
a vacuum box assembly having opening providing means in one side thereof and communicating with a vacuum source for creating a vacuum condition in said box assembly;

perforated endless conveyor means, including a run portion covering the opening providing means in said box and having ports forming perforations, and also including a plurality of resilient hollow suction cups mounted around said ports to depend therefrom and, with said ports, forming passages communicating with the interior of the vacuum box;

releasable members received within said passages each member including a valve guide part, comprising a section extending in the axial direction of said passages and a substantially immediately extending return section, connected with a laterally extending retainer part for positioning the member in predetermined position along the axis of the passage in which it is received; and a vacuum responsive valve slidably mounted by said guide part for movement between an inoperative position and an operative position substantially dis-communicating said passages when said resilient cups are not sealed to a product and a predetermined vacuum exists in said vacuum box assembly.

21. Transfer apparatus for lifting bakery products, such as bread loaves, from a product-supplying conveyor and transferring them to a remote discharge location comprising:

a vacuum box assembly between said product supplying conveyor and discharge location having elongate opening providing means in one side thereof and communicating with a vacuum source for creating a vacuum condition in said vacuum box assembly, said vacuum box assembly and opening providing means including an upstream portion and a downstream portion;

perforate endless conveyor means, including a run section for traveling along the opening providing means in said vacuum box assembly from the upstream portion toward the downstream portion;

resilient product-engaging suction transfer means mounted on said conveyor means and including passages communicating with the perforations in said endless conveyor means;

valves associated with said passages and operative under a predetermined vacuum applied to them for selectively reducing air flow through said passages;

actuatable means for selectively reducing the vacuum applied to the passages in the downstream portion of said transfer means to thereby increase the vacuum applied to the passages in the upstream portion thereof and move said valves for passages proceeding progressively along said upstream portion to flow reducing position to permit the vacuum in said vacuum box assembly to build to a predetermined desired level and condition the machine for operation under its rated vacuum; and means responsive to less than a predetermined vacuum condition in said box for operating said actuable means to reduce the vacuum applied to the passages in the transfer means portions communicating with the downstream portions of the vacuum box assembly.

22. Transfer apparatus for lifting bakery products, such as bread loaves, from a product-supplying conveyor and transferring them to a remote discharge location comprising:

a vacuum box assembly between said product supplying conveyor and discharge location having opening providing means in one side thereof and communicating with a vacuum source for creating a vacuum condition in said vacuum box assembly, said vacuum box assembly including an upstream portion and a downstream portion;

perforate endless conveyor means, including a run section for traveling along the opening providing means in said vacuum box assembly from the upstream portion toward the downstream portion;

a plurality of resilient product-engaging suction transfer means mounted on said conveyor means and including passages communicating with the performations in said endless conveyor means;

valves associated with said passages and operative under a predetermined vacuum applied to them for selectively reducing air flow through said passages; and actuable means movable for selectively substantially isolating the passages in a downstream portion of said transfer means from said vacuum source to thereby increase the vacuum applied to the passages in an upstream portion thereof and move said valves for passages proceeding progressively along said upstream portion to flowreducing position to permit the vacuum in said vacuum box assembly to build to a predetermined desired level and condition the machine for operation at a predetermined vacuum level.

23. Transfer apparatus for lifting bakery products, such as bread loaves, from a product-supplying conveyor and transferring them to a remote discharge location comprising:

a vacuum box between said product supplying conveyor and discharge location having an opening in the bottom thereof and communicating with a vacuum source for creating a vacuum condition in said box, said box including an upstream portion and a downstream portion;

perforated endless conveyor means, including a lower run section for traveling along the opening in said box from the upstream portion toward the downstream portion;

a plurality of resilient suction cups mounted on said conveyor means and including passages communicating with the perforations in said endless conveyor means;

valves associated with said cups and operative under a predetermined vacuum applied to them for selectively blocking said passages; and actuable means movable for selectively generally segregating the cups communicating with a downstream portion of said box from said vacuum source to thereby increase the vacuum applied by the source to the cups communicating with an upstream portion of the box and move said valves for cups proceeding progressively from said upstream portion to blocking position to permit the vacuum in said box to build to a predetermined desired level.

24. The depanner of claim 23 wherein pressure sensing means is operative to control said actuable means and move at least a portion thereof to one position for reducing vacuum applied to the downstream cups and another position for increasing the vacuum applied to cups at the downstream portion of the box.

25. The depanner of claim 24 wherein said pressure sensing means moves the actuable means to said position for reducing vacuum when it senses a predetermined low vacuum condition in one portion of said box and to said another position when it senses a predetermined higher vacuum condition.

26. Depanning apparatus for lifting bakery products, such as bread loaves, from pans on a product supplying conveyor and transferring them to a remote location comprising:

a vacuum box, having an opening in one side thereof, communicating with a vacuum source for creating a vacuum condition in said box;

perforated endless conveyor means, including a run traveling along the opening in said box;

a plurality of resilient cups mounted on said conveyor means and including passages communicating with the perforations in said endless conveyor means;

support means mounted on said endless coveyor means;

vacuum responsive valve means having a predetermined weight mounted on said support means for movement a predetermined distance between an inoperative position and an operative position blocking said passages when said resilient cups are not sealed to a product and a predetermined vacuum exists in said cups;

means for generally segregating the cups communicating with a downstream portion of said box from said vacuum source to thereby increase the vacuum applied by the source to the cups communicating with an upstream portion of the box and move said valves for cups proceeding progressively from said upstream portion to blocking position to permit the vacuum in said box to build to a predetermined condition.

* * * * *